(12) United States Patent
Cross et al.

(10) Patent No.: US 7,906,027 B2
(45) Date of Patent: Mar. 15, 2011

(54) MERCURY REMOVAL PROCESS

(75) Inventors: Joseph B. Cross, Bartlesville, OK (US); John M. Hays, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 370 days.

(21) Appl. No.: 12/238,537

(22) Filed: Sep. 26, 2008

(65) Prior Publication Data
US 2010/0078390 A1   Apr. 1, 2010

(51) Int. Cl.
C02F 1/28 (2006.01)
C02F 1/62 (2006.01)

(52) U.S. Cl. .................................. 210/688; 210/914

(58) Field of Classification Search .................. 210/688, 210/914
See application file for complete search history.

(56) References Cited

U.S. PATENT DOCUMENTS

| | | | |
|---|---|---|---|
| 3,736,253 A | | 5/1973 | De Angelis et al. |
| 3,749,761 A | | 7/1973 | Dean et al. |
| 3,786,619 A | * | 1/1974 | Melkersson et al. ............ 95/134 |
| 4,057,423 A | | 11/1977 | Kinoshita |
| 4,578,195 A | * | 3/1986 | Moore et al. ................. 210/679 |
| 5,080,799 A | | 1/1992 | Yan |
| 5,607,496 A | | 3/1997 | Brooks |
| 6,521,131 B1 | | 2/2003 | Hamilton et al. |
| 7,419,606 B2 | * | 9/2008 | Johnson et al. .............. 210/752 |
| 2005/0194320 A1 | * | 9/2005 | Kennard et al. .............. 210/688 |
| 2007/0224112 A1 | * | 9/2007 | Iannicelli ................... 423/658.5 |

FOREIGN PATENT DOCUMENTS

| | | |
|---|---|---|
| EP | 0202364 | 11/1986 |
| EP | 0 497 749 B1 | 9/1994 |
| EP | 1 316 353 B1 | 4/2007 |
| JP | 5827689 | 2/1983 |
| JP | 58027689 A * | 2/1983 |
| JP | 209709 A | 7/1983 |
| WO | WO 98/06478 | 2/1998 |
| WO | WO2008079919 | 7/2008 |

OTHER PUBLICATIONS

Nucon Bullitin 11B28, Aug. 2004, Nucon International, Inc.*
Mersorb LW Product Data [online], Selected Adsorption Associates, Inc., [retrieved on May 17, 2005]. Retrieved from the internet: <URL: http://selectiveadorption.com/mersorlw.htm on May 17, 2005>.*
"A White Paper Describing Produced Water from Production of Crude Oil, Natural Gas, and Coal Bed Methane"—Veil et al. Prepared by Argonne Natioal Laboratory, Argonne, Illinois, for the U.S. Department of Energy, National Energy Technology Laboratory, DOE Contract W-31-109-Eng-38, Jan. 2004.
"Selenium Sulfide—A New Detector for Mercury Vapor"—Nordlander, Journal of Industrial and Engineering Chemistry, (1927), 19, 518-521.
"Radio Release Determination of Mercury Vapour in Air Using Radioactive Kryptonate of Selenium Sulfide"—Naoum et al., J. of Radioanalytical Chemistry, (1975), 25(1), 129-140.
"Biological Interaction Between Transition Metals (Ag, Cd, and Hg), Selenide/Sulfide and Selenoprotein P"—Sasakura et al., J. Inorg. Biochem., Sep. 1998—71(3-4): 159-162.
PCT/US2009/057888 International Search Report ( Form PCT/ISA/220) dated Dec. 16, 2009.
Sandra Vitolo, Roberto Pini: "Deposition of sulfur from H2S on porous adsorbents and effect on their mercury adsorption capacity", Geothermics, vol. 28, Jan. 1, 1999-Dec. 31, 1999 pp. 341-354.

* cited by examiner

*Primary Examiner* — Matthew O Savage

(57) ABSTRACT

A process for removing mercury from an aqueous stream using a supported selenium and sulfur material is disclosed.

17 Claims, No Drawings

MERCURY REMOVAL PROCESS

The invention relates to an improved process for removing mercury from a water stream. More particularly, the invention relates to the use of a composition containing selenium, sulfur and a porous support for the removal of mercury from a water stream.

SUMMARY OF THE INVENTION

In accordance with this invention, a process for removing mercury from a water stream is provided which includes contacting a feed stream comprising water and mercury with a composition comprising selenium, sulfur and a porous support for removal of at least a portion of the mercury from the feed stream thereby forming a treated stream comprising less mercury than the feed stream.

DETAILED DESCRIPTION OF THE INVENTION

The feed stream of the current invention can be any aqueous stream containing mercury from a source such as, but not limited to, produced water generated during oil production, or a petroleum refinery, or a mining operation, or a power plant, and is most typically produced water generated during oil production. The feed stream typically comprises water and a mercury compound. The mercury is typically present as elemental mercury, but can also be a mercury compound.

The feed stream is contacted with a composition comprising, consisting of, or consisting essentially of, selenium, sulfur and a porous support for removal of at least a portion of the mercury from the feed stream thereby forming a treated stream comprising less mercury than the feed stream. Preferably, at least a portion of the selenium and sulfur present in the composition is in the form of selenium sulfide.

Preferably, the concentration of selenium of the composition, on an elemental selenium basis, is in the range of from about 2 to about 20 wt. %, more preferably from about 5 to about 15 wt. %, and most preferably from about 8 to about 10 wt. %.

The porous support is selected from the group consisting of an inorganic oxide, carbon and combinations thereof, and more preferably is selected from the group consisting of alumina, carbon and combinations thereof. Most preferably, the porous support is carbon.

The feed stream is contacted with a sufficient quantity of the composition such that the treated stream contains at most about 30%, preferably at most about 20%, more preferably at most about 10%, of the mercury contained in the feed stream, on an elemental mercury basis.

The temperature at which the feed stream is contacted with the composition is in the range of from about 20° C. to about 90° C., preferably from about 40° C. to about 75° C., and more preferably from about 50° C. to about 75° C.

The feed stream is preferably contacted with the composition at a pH between about 2 and about 11, more preferably a pH between about 3 and about 10, and most preferably a pH between about 3 and about 7.

EXAMPLES

The following examples illustrate the effectiveness of the inventive process for removing mercury from an aqueous stream.

The sorbents were tested for mercury removal from aqueous systems by use of a bottle test where approximately 0.15 g to 0.22 g of sorbent was mixed with approximately 20 to 21 g of water spiked with approximately 250 ppbw Hg using a RCRA Metals Standard. The selenium sulfide on carbon sorbents of Examples 1 and 2 were compared to a sulfur/carbon mercury sorbent material (containing about 13 wt. % sulfur) obtained from Nucon International, Inc. referred to as MERSORB®-LW; and also compared to an activated carbon material referred to as Calgon DSR-A.

Example 1

Sorbent A

Sorbent A was a sulfided carbon sorbent (MERSORB®-LW material) which had been used for removing selenium from a simulated refinery sour water effluent stream spiked with selenium. Sorbent A contained approximately 8 to 10 wt. % selenium, on an elemental selenium basis. The aqueous systems used for the testing in Example 1 were at a pH between around 3 and around 4. Results comparing Sorbent A to the control materials are shown in Table 1 below.

Example 2

Sorbents B and C

Sorbents B and C were sulfided carbon sorbents (MERSORB®-LW material) which had been used for removing selenium from a selenium containing refinery waste water effluent stream. Sorbents B and C each contained greater than about 10 wt. % Se on an elemental selenium basis. Sorbent A was taken from Bed 1 of a multi-bed selenium removal treatment system, and Sorbent B was taken from downflow Bed 2 of that same multi-bed selenium removal treatment system. The aqueous systems used for the testing in this Example 2 were at a pH between around 3 and around 4.

Results comparing Sorbents B and C to the control materials are shown in Table 2 below.

As can be seen from Tables 1 and 2, the selenium/sulfur/carbon sorbents are effective for removing mercury from an aqueous system.

TABLE 1

| Sorbent | Wt. Water/Hg Solution | Wt. Sorbent | Temp ° C. | PPBW (Hg) |
|---|---|---|---|---|
| Mersorb LW | 21.0 | 0.16 | 23 | 0 |
| Mersorb LW | 21.0 | 0.16 | 23 | 0 |
| Mersorb LW | 21.0 | 0.16 | 23 | 0.2 |
| Sorbent A | 21.1 | 0.16 | 23 | 74 |
| Sorbent A | 21.1 | 0.16 | 23 | 59 |
| Sorbent A | 21.1 | 0.16 | 23 | 60 |
| Calgon DSR | 21.1 | 0.15 | 23 | 127 |
| Calgon DSR | 21.1 | 0.15 | 23 | 144 |
| Calgon DSR | 21.1 | 0.15 | 23 | 145 |
| No Sorbent | 21.1 | — | 23 | 215 |
| No Sorbent | 21.1 | — | 23 | 225 |
| No Sorbent | 21.1 | — | 23 | 221 |
| Mersorb LW | 21.1 | 0.16 | 70 | 0.5 |
| Mersorb LW | 21.1 | 0.16 | 70 | 2.2 |
| Mersorb LW | 21.1 | 0.16 | 70 | 2.4 |
| Sorbent A | 21.1 | 0.16 | 70 | 7.5 |
| Sorbent A | 21.1 | 0.16 | 70 | 4 |
| Sorbent A | 21.1 | 0.16 | 70 | 4 |
| Calgon DSR-A | 21.1 | 0.15 | 70 | 62 |
| Calgon DSR-A | 21.1 | 0.15 | 70 | 92 |
| Calgon DSR-A | 21.1 | 0.15 | 70 | 101 |
| No Sorbent | 21.1 | — | 70 | 209 |
| No Sorbent | 21.1 | — | 70 | 221 |
| No Sorbent | 21.1 | — | 70 | 221 |

TABLE 2

| Sorbent | Temp ° C. | Wt. Water/Hg Solution | Wt. Sorbent | PPBW (Hg) |
|---|---|---|---|---|
| Mersorb LW | 23 | 20.0 | 0.16 | 11 |
| Mersorb LW | 23 | 20.0 | 0.16 | 11 |
| Mersorb LW | 23 | 20.0 | 0.16 | 11 |
| Sorbent B | 23 | 20.0 | 0.16 | 32 |
| Sorbent B | 23 | 20.0 | 0.16 | 32 |
| Sorbent B | 23 | 20.0 | 0.16 | 32 |
| Sorbent C | 23 | 20.0 | 0.15 | 1.2 |
| Sorbent C | 23 | 20.0 | 0.15 | 1.2 |
| Sorbent C | 23 | 20.0 | 0.15 | 1.2 |
| Calgon DSR-A | 23 | 20.0 | 0.17 | 1.5 |
| Calgon DSR-A | 23 | 20.0 | 0.17 | 1.5 |
| Calgon DSR-A | 23 | 20.0 | 0.17 | 1.6 |
| No Sorbent | 23 | 20.0 | — | 226 |
| No Sorbent | 23 | 20.0 | — | 232 |
| No Sorbent | 23 | 20.0 | — | 226 |
| Mersorb LW | 70 | 20.0 | 0.22 | 0.7 |
| Mersorb LW | 70 | 20.0 | 0.22 | 0.6 |
| Mersorb LW | 70 | 20.0 | 0.22 | 1.1 |
| Sorbent B | 70 | 20.0 | 0.15 | 0.3 |
| Sorbent B | 70 | 20.0 | 0.15 | 0.9 |
| Sorbent B | 70 | 20.0 | 0.15 | 0.5 |
| Sorbent C | 70 | 20.0 | 0.16 | 0.4 |
| Sorbent C | 70 | 20.0 | 0.16 | 0.2 |
| Sorbent C | 70 | 20.0 | 0.16 | 0 |
| Calgon DSR-A | 70 | 20.0 | 0.16 | 0.5 |
| Calgon DSR-A | 70 | 20.0 | 0.16 | 0.4 |
| Calgon DSR-A | 70 | 20.0 | 0.16 | 0.3 |
| No Sorbent | 70 | 19.7 | — | 185 |
| No Sorbent | 70 | 19.7 | — | 187 |
| No Sorbent | 70 | 19.7 | — | 208 |

Whereas this invention has been described in terms of the preferred embodiments, reasonable variations and modifications are possible by those skilled in the art. Such modifications are within the scope of the described invention and appended claims.

That which is claimed is:

1. A method for removing mercury from a feed stream comprising water and mercury which comprises:
    relocating a composition recovered from a selenium removal treatment system used for removing selenium from an effluent stream, wherein said composition is relocated for contact with said feed stream to remove the mercury in solution with said water; and
    contacting said feed stream with said composition comprising selenium, sulfur and a porous support for removal, by said composition, of at least a portion of the mercury in said feed stream resulting in a treated stream comprising less mercury than said feed stream.

2. The method of claim 1 wherein at least a portion of the selenium and sulfur of said composition are present as selenium sulfide.

3. The method of claim 1 wherein said composition comprises between about 2 and about 20 wt. % selenium.

4. The method of claim 1 wherein said composition comprises between about 5 and about 15 wt. % selenium.

5. The method of claim 1 wherein said composition comprises between about 8 and about 10 wt. % selenium.

6. The method of claim 1 wherein said feed stream is contacted with said composition at a temperature in the range of from about 20° C. to about 90° C.

7. The method of claim 1 wherein said feed stream is contacted with said composition at a temperature in the range of from about 40° C. to about 75° C.

8. The method of claim 1 wherein said feed stream is contacted with said composition at a temperature in the range of from about 50° C. to about 75° C.

9. The method of claim 1 wherein said feed stream is contacted with said composition at a pH between about 2 and about 11.

10. The method of claim 1 wherein said feed stream is contacted with said composition at a pH between about 3 and about 10.

11. The method of claim 1 wherein said feed stream is contacted with said composition at a pH between about 3 and about 7.

12. The method of claim 1 wherein said treated stream comprises at most about 30% of the mercury contained in said feed stream, on an elemental mercury basis.

13. The method of claim 1 wherein said treated stream comprises at most about 20% of the mercury contained in said feed stream, on an elemental mercury basis.

14. The method of claim 1 wherein said treated stream comprises at most about 10% of the mercury contained in said feed stream, on an elemental mercury basis.

15. The method of claim 1 wherein said porous support is selected from the group consisting of an inorganic oxide, carbon and combinations thereof.

16. The process of claim 1 wherein said porous support is selected from the group consisting of alumina, carbon and combinations thereof.

17. The process of claim 1 wherein said porous support is carbon.

* * * * *